United States Patent [19]
Whikehart et al.

[11] Patent Number: 5,936,438
[45] Date of Patent: Aug. 10, 1999

[54] DIGITAL OSCILLATOR USING LOOKUP TABLE WITH MULTIPLE CYCLES

[75] Inventors: J. William Whikehart, Novi; Bradley Anderson Ballard, Belleville, both of Mich.

[73] Assignee: Ford Motor Company, Dearborn, Mich.

[21] Appl. No.: 08/941,959

[22] Filed: Oct. 1, 1997

[51] Int. Cl.[6] ..................................... H03B 21/00
[52] U.S. Cl. .................. 327/106; 327/119; 327/129; 364/718.03
[58] Field of Search .................. 327/105–107, 327/119, 120, 129; 364/718.01, 718.02, 718.03

[56] References Cited

U.S. PATENT DOCUMENTS

| | | | |
|---|---|---|---|
| 4,998,072 | 3/1991 | Sheffer | 328/14 |
| 5,031,131 | 7/1991 | Mikos | 364/721 |
| 5,034,977 | 7/1991 | Chen et al. | 379/361 |
| 5,126,960 | 6/1992 | Thong | 364/721 |
| 5,198,779 | 3/1993 | Bruton | 328/14 |
| 5,363,443 | 11/1994 | Petty | 379/418 |

*Primary Examiner*—Kenneth B. Wells
*Assistant Examiner*—Minh Nguyen
*Attorney, Agent, or Firm*—Mark Mollon

[57] ABSTRACT

A digital waveform oscillator generates digitized waveforms without distortion using a lookup table. The frequencies which may be generated using direct lookup tables at their fundamental table frequencies are increased according to this invention by including multiple cycles of the waveform within a single table. The selection of a table length L and a number of cycles N to be stored in a lookup table is done in a manner to optimize corresponding values of the frequencies to be generated and the sample rate.

2 Claims, 2 Drawing Sheets

DIGITAL OSCILLATOR USING LOOKUP TABLE WITH MULTIPLE CYCLES

BACKGROUND OF THE INVENTION

The present application is related to co-pending application U.S. Pat. No. 5,892,692, entitled "Method of Generating a Lookup Table for a Digital Oscillator", which was filed concurrently herewith.

The present invention relates in general to a digital oscillator for generating a sampled digital signal at a predetermined frequency, and more specifically, to a digital oscillator generating sinewaves using a lookup table.

Many types of digital signal processing equipment need to generate various signal waveforms during operation. For example, music synthesizers generate variously shaped waveforms at various frequencies. Radio receivers generate injection signals at predetermined frequencies for mixing with information signals to perform frequency translations.

Various techniques have been developed for generating digital waveforms. The technique used in any particular application depends upon the signal quality needed, whether a fixed or variable frequency signal is needed, signal processing capabilities available, desired component cost, and other factors. Use of a mathematical formula to generate sample values of a digital waveform provides high accuracy representation of the signal but requires higher processing capability and results in higher costs. In applications where only a fixed frequency or a limited number of frequencies are needed, a lookup table storing actual signal samples can be employed as a lower cost solution. Variable frequencies can be obtained using interpolation between samples in a lookup table, but noise and distortion are added and more signal processing capability must be provided.

Applications which only require a fixed frequency can generate a digitally sampled signal without noise or distortion, but only at integer multiples of a fundamental table frequency. Distortion is avoided since the needed sample values are all contained within the table and no interpolation between values is necessary. One example of an application needing only a fixed frequency is in generating a mixing signal used in a radio receiver to frequency shift a modulated signal, such as an intermediate frequency signal in a superheterodyne receiver.

The fundamental table frequency corresponds to the lowest frequency that can be generated from the table and is equal to the sample rate at which the digital signal is produced divided by the number of samples for one cycle of the stored waveform in the table. To generate the lowest frequency available, the table address is stepped one address at a time with the address looping back to zero at the end of the table so that the table output is a steam of values representing the waveform. To generate twice the frequency, the address step size is set to two so that only half the samples are used. Higher integer multiples of the fundamental table frequency are obtained using larger address step sizes (but only up to the point where the frequency generated is half the sample frequency). In order to obtain variable step sizes, the oscillator must use an adder in order to generate successive table addresses for producing an oscillator output signal. This results in added complexity and cost over a simple counter which can be used when only using a step size of one.

The step size between consecutive samples in the table corresponds to a phase increment $\Delta$. In order to produce a periodic signal at a desired frequency without distortion and without sample correction or interpolation in prior art digital oscillators, $\Delta$ must divide evenly into one cycle of the waveform as stored in the table. In other words, phase coherence must be maintained when wrapping around from the end of the table back to the beginning of the table. Thus, at a given sample rate $f_s$, only a limited number of frequencies can be produced without distortion since the phase increment $\Delta$ inherent in the table must evenly divide into one cycle of the waveform (usually a sinewave). By reducing the phase increment $\Delta$ (i.e., by increasing the sample rate of the table), it is possible to increase the number of frequencies which can be generated. However, substantially increasing the sample rate adds substantial cost to the processor.

Alternatively, it would be possible to vary the sample rate during operation in order to facilitate use of a lookup table to generate the periodic signals over a range of frequencies, but the sample rate must normally remain fixed during system operation.

SUMMARY OF THE INVENTION

The present invention has the advantage that a lookup table can be used to generate periodic sinewave signals at desired frequencies without distortion in a way that provides increased flexibility in obtaining any desired frequency at the fundamental frequency of the table (which simplifies table addressing).

In one aspect, the present invention provides a digital oscillator for generating a periodic signal at the desired frequency comprising a lookup table containing N entries. Each entry is a sample of the periodic signal taken at a predetermine phase increment. Addressing means steps through entries from the lookup table for outputting at a predetermined sample rate to generate the periodic signal at the desired frequency. The phase increment does not evenly divide into one cycle of the periodic signal. Instead, the lookup table includes a plurality of cycles of the periodic signal so that the phase increment divides substantially evenly into the plurality of cycles.

In addition, the present invention optimizes a selection of table length and the number of cycles to be included in the lookup table in order to provide the desired periodic signal at the desired frequency without distortion or requiring interpolation.

DETAILED DESCRIPTION OF PREFERRED EMBODIMENTS

Figure 1:
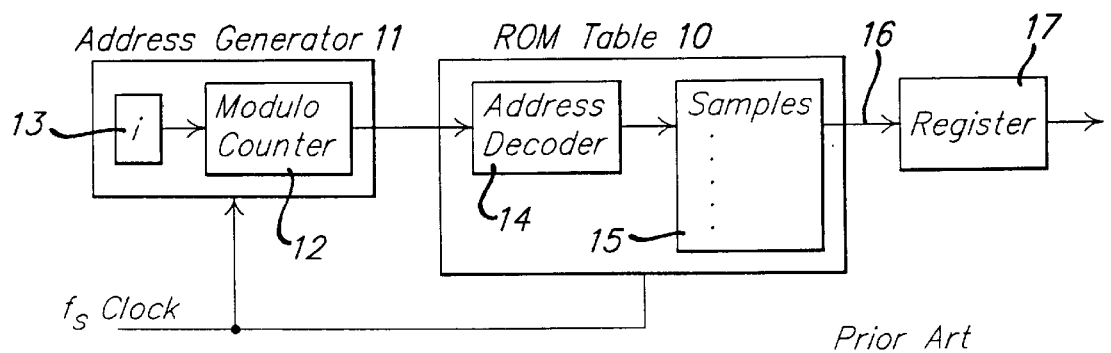
FIG. 1 is a block diagram showing a prior art lookup table oscillator.

FIG. 1 shows a prior art hardware arrangement for generating digital oscillator signals using a ROM lookup table 10 and an address generator 11. A system sample rate is determined by a signal provided as a clock signal $f_s$ which is input to ROM table 10 and address generator 11. Address generator 11 provides an index signal i to step through ROM table 10. A modulo counter 12 in incremented by a index signal I from block 13 at each pulse of the sample rate clock. Modulo counter 12 counts from zero up to the total number of samples in ROM 10 and then wraps around back to zero. ROM table 10 includes an address decoder 14 and signal samples 15. At each sample rate clock pulse, address decoder 14 converts the output from modulo counter 12 into a storage location for a corresponding sample 15 and the sample is output at a ROM table output 16, which may further be coupled to a register 17, for example.

In order to generate an output signal at the fundamental table frequency, index signal i is set equal to 1. Integer multiples of the fundamental table frequency are generated by correspondingly setting index I to the integer multiple. The configuration of FIG. 1 is extremely efficient in the use of DSP hardware since no interpolation between samples and no fractional adjustment of the phase increment are provided.

Figure 2:
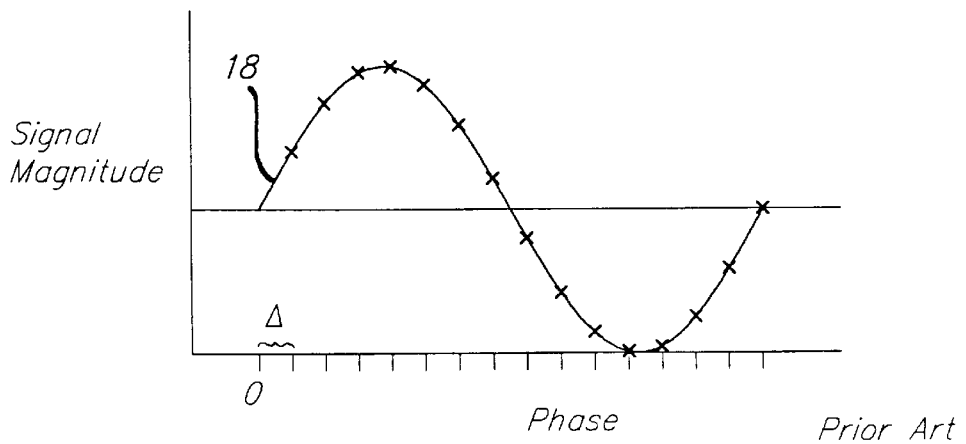
FIG. 2 is a waveform diagram illustrating the prior art relationship of table values to the analog waveform represented.

ROM table 10 in prior art oscillators has included a single cycle of the waveform to be generated as shown in FIG. 2. A continuous waveform 18 in the form of a sinewave is the desired periodic signal to be represented. Samples are stored according to a phase increment Δ which evenly divides into the full cycle of the waveform so that phase coherence is maintained from sample to sample during production of the periodic signal. Sample values designated by x's are determined at the phase increment and are stored consecutively in the ROM table. During production of the periodic signal by the digital oscillator, the phase increment Δ corresponds to the sample rate. Distortion free signals can only be generated at certain predetermined frequencies. In addition to the fundamental table frequency, other frequencies can be generated by stepping through the table with an index of greater than one (which changes the phase increment Δ). However, table indexing at values other than one adds complexity and cost to the oscillator.

Figure 3:
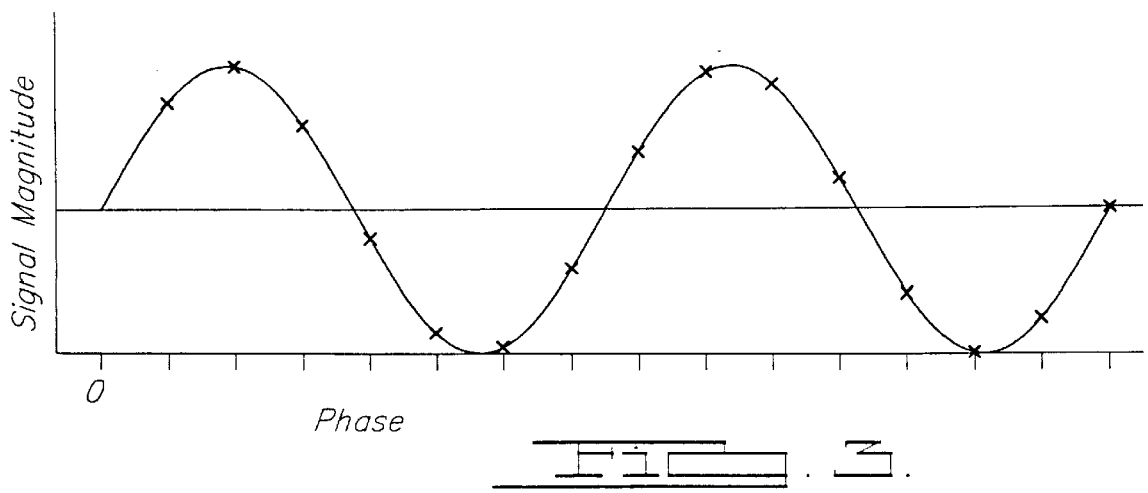
FIG. 3 is a waveform diagram showing table values according to the present invention.

The present invention modifies the ROM table as illustrated in FIG. 3. In the present invention, the ROM table includes multiple cycles of the periodic waveform to be generated so that a phase increment can be selected which lacks phase continuity for one full cycle but does provide phase continuity after 2 or more cycles. For the prior art single cycle, the fundamental table frequency is equal to the sample rate divided by the number of samples in the table. In the case of the present invention, the fundamental table frequency equals the sample rate times the number of cycles stored in the table divided by the total number of samples in the table. Thus, with the two cycles stored as shown in FIG. 3, additional desired frequencies can be generated while using only the fundamental table frequency. As the number of full cycles contained in the ROM table is increased further, additional flexibility is obtained for generating desired frequencies without distortion and without requiring special table indexing.

Figure 4:
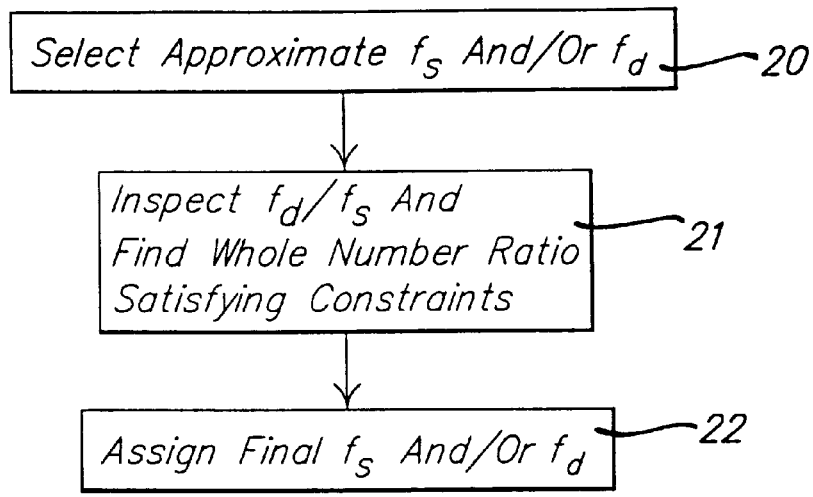
FIG. 4 is a flowchart showing a method for optimally selecting table length and the number of cycles to be stored in the lookup table.
Figure 5:
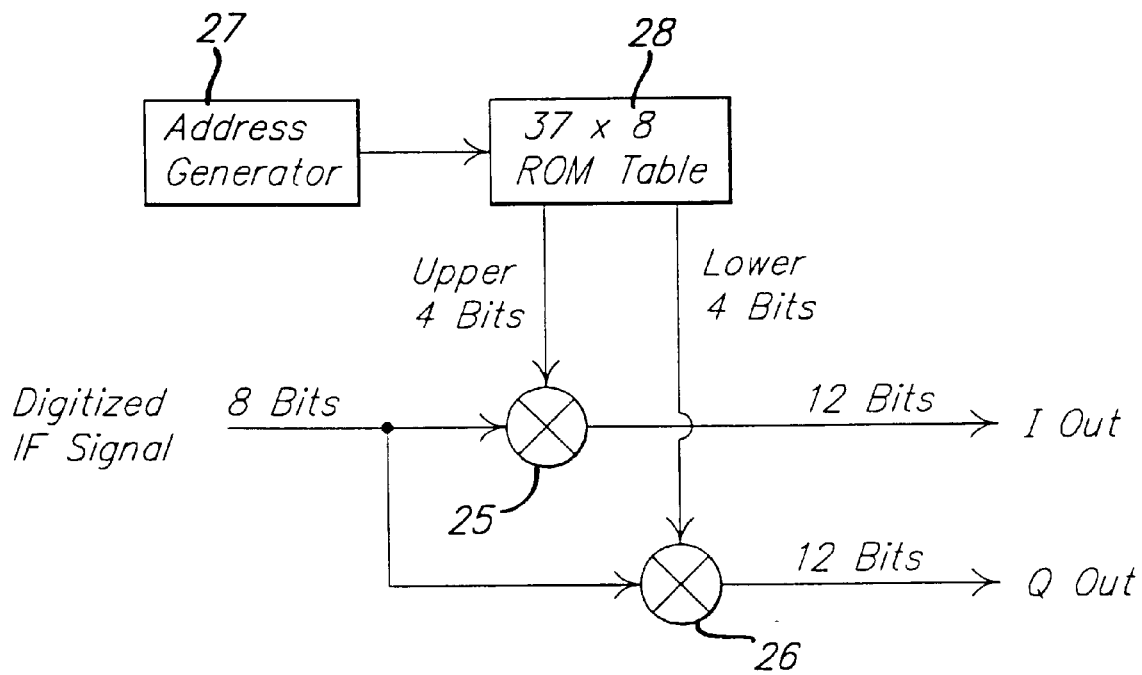
FIG. 5 is a block diagram showing a preferred embodiment of the present invention for generating periodic signals in quadrature.

In a further aspect of the invention, a method is provided for selecting a table length L and a number of cycles N to be stored in the lookup table to generate a periodic signal having a frequency $f_d$ and a sample rate $f_s$, as shown in FIG. 4. Since the lookup table of the present invention cannot generate any arbitrary frequency, the method of this invention optimizes selection of table length L and number of cycles N with the desired frequency to be generated and the sample rate to allow the simplified lookup table method to be used for a maximum number of oscillator applications. In the event that one or the other of the sample rate or the desired signal frequency is predetermined by some essential requirement, the present method allows the remaining parameter to be selected very close to its desired optimum value.

Referring to FIG. 4, within a digital processing system design activity, an approximate sample rate $f_s$ and/or an approximate desired frequency $f_d$ are selected in step 20. These values are selected which are optimal under the design conditions of the system. In some applications, one or the other of $f_s$ or $f_d$ may have a single required value which is fixed and cannot be changed. With these initial values of $f_s$ and $f_d$, a ratio is formed equal to $f_d/f_s$. The ratio $f_d/f_s$ is inspected in step 21 and a reduced whole number ratio is found which is approximately equal to this ratio and which satisfies certain constrains: namely that the numerator is greater than 1 in order to represent more than one cycle and the denominator is not greater than the maximum desired table length (an excessive table length wastes ROM space). Thus, where the table length is L and the number of cycles is N, a ratio of whole integers N/L is selected which is approximately equal to the ratio of $f_d/f_s$. Once the ratio of whole integers is found, then the values of $f_d$ and $f_s$ in the ratio of $f_d/f_s$ are adjusted in step 22 until the ratio exactly equals the ratio of whole integers N/L. If one of the frequency values is fixed and unchangeable, then the ratio of whole integers is used to determine the final value for the other frequency value. Thus, if the oscillator were to be used in a radio receiver for generating an injection signal at a predetermined frequency (such as 10.7 MHz in an FM receiver), then the final value for sample rate $f_s$ is set according to the value $$\frac{f_d \times L}{N}.$$

However, final values for $f_s$ and $f_d$ can be determined to satisfy any requirements present in the system.

By way of example, a radio receiver was designed where a need for a 10.7 MHz oscillator signal was known in advance and it was known that a sample rate of about 40 MHz would be required. Inspecting the ratio $$\frac{10.7 \text{ MHz}}{40 \text{ MHz}},$$

an equivalent ratio of whole integers $$\frac{10}{37}$$

was selected which corresponds to a table length of 37 samples and 10 full cycles of the waveform. Since the frequency of the desired signal is fixed at 10.7 MHz, a sample rate of 39.59 MHz was determined so that the 10.7 MHz injection signals for performing an intermediate frequency mix could be generated without distortion.

In a further embodiment, the present invention is used to generate quadrature injection signals using a single ROM table containing signal value pairs for two signals separated in phase by 90°. An 8-bit digitized IF signal in a radio receiver is supplied to one input of a multiplier 25 and one input to a multiplier 26. An address generator 27 provides incremental addresses to a 37×8 ROM table 28. Each of the 37 samples in ROM table 28 includes 8 bits, the upper 4 bits of which represent an in-phase signal sample and the lower 4 bits of which represent a quadrature signal sample. The upper 4 bits are provided to a second input of multiplier 25 and the lower 4 bits are provided to a second input of multiplier 26. The outputs of multipliers 25 and 26 provide 12-bit output signals representing the in-phase component and the quadrature-phase component, respectively. As in the previous example, ROM table 28 includes 10 cycles of the sinewave to be generated, so that incrementing through the entire ROM table 28 results in the production of 10 cycles of the complex injection sinewaves for the intermediate frequency mix.

What is claimed is:

1. A digital oscillator for generating a periodic signal at a desired frequency, comprising:

a lookup table containing N entries, each entry being a sample of said periodic signal taken at a predetermined phase increment; and addressing means for stepping through entries from said lookup table for outputting at a predetermined sample rate to generate said periodic signal at said desired frequency;

wherein said phase increment does not evenly divide into one cycle of said periodic signal and wherein said lookup table includes a plurality of cycles of said periodic signal so that said phase increment divides substantially evenly into said plurality of cycles.

2. The oscillator of claim 1 wherein a pair of periodic quadrature signals are generated and wherein each table entry includes an in-phase component and a quadrature-phase component stored together.

\* \* \* \* \*